Oct. 22, 1935.                    J. R. RAMIN                        2,018,533
                    CONTINUOUSLY VARIABLE CHANGE SPEED GEAR
                            Filed Nov. 30, 1934          4 Sheets-Sheet 1
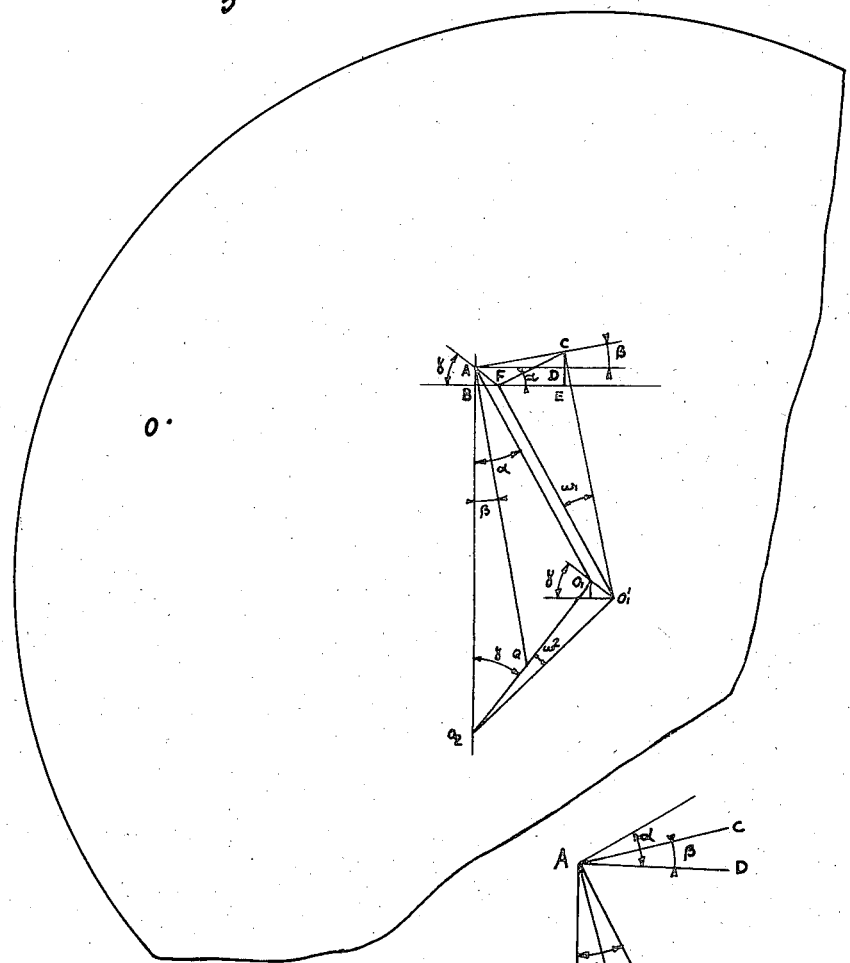
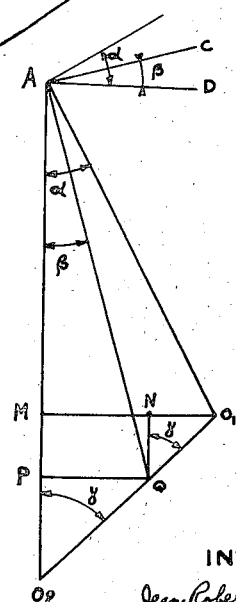
INVENTOR
Jean Robert Ramin
by his atty's
Byrnes, Stebbins & Blenko

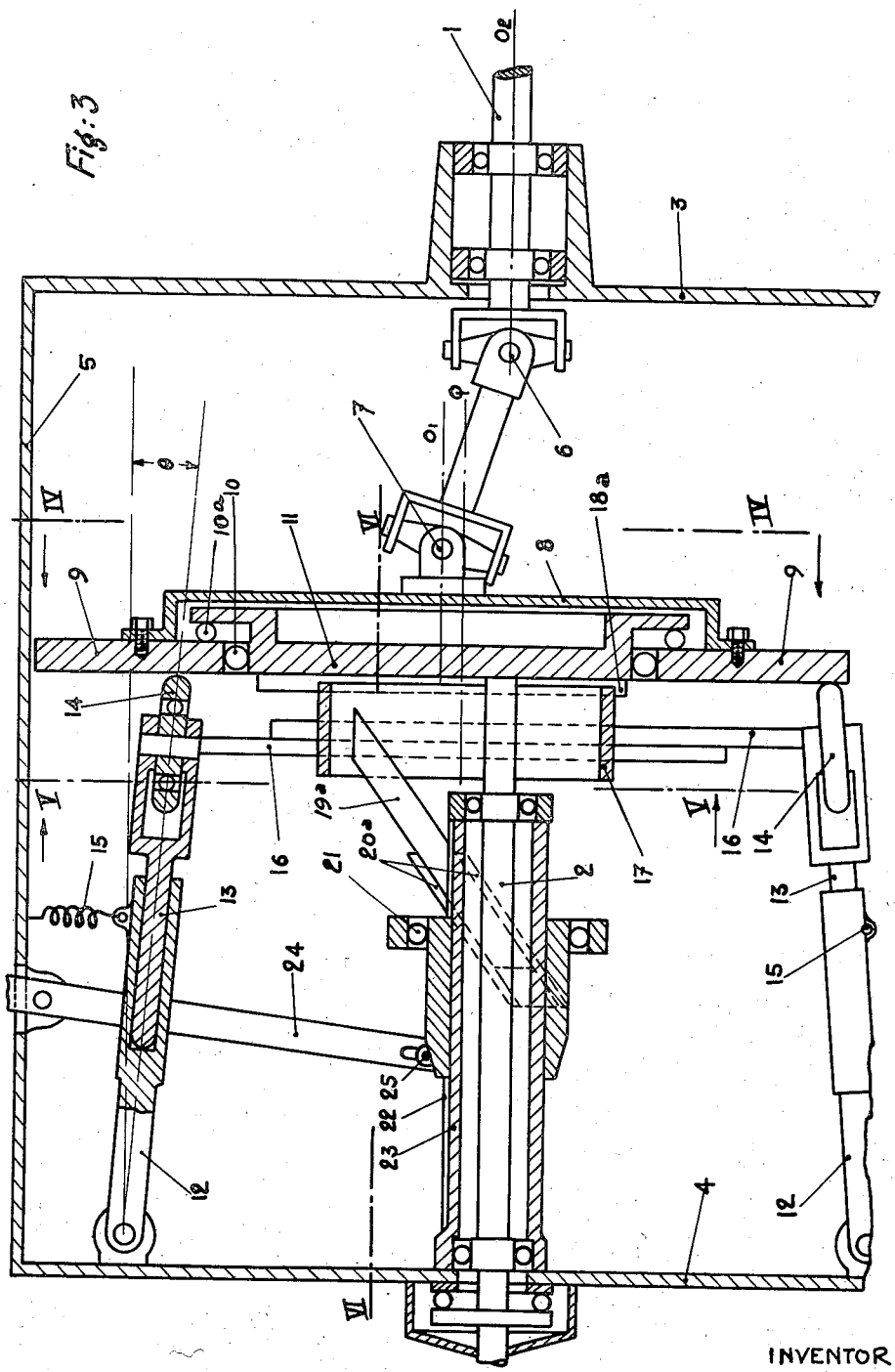

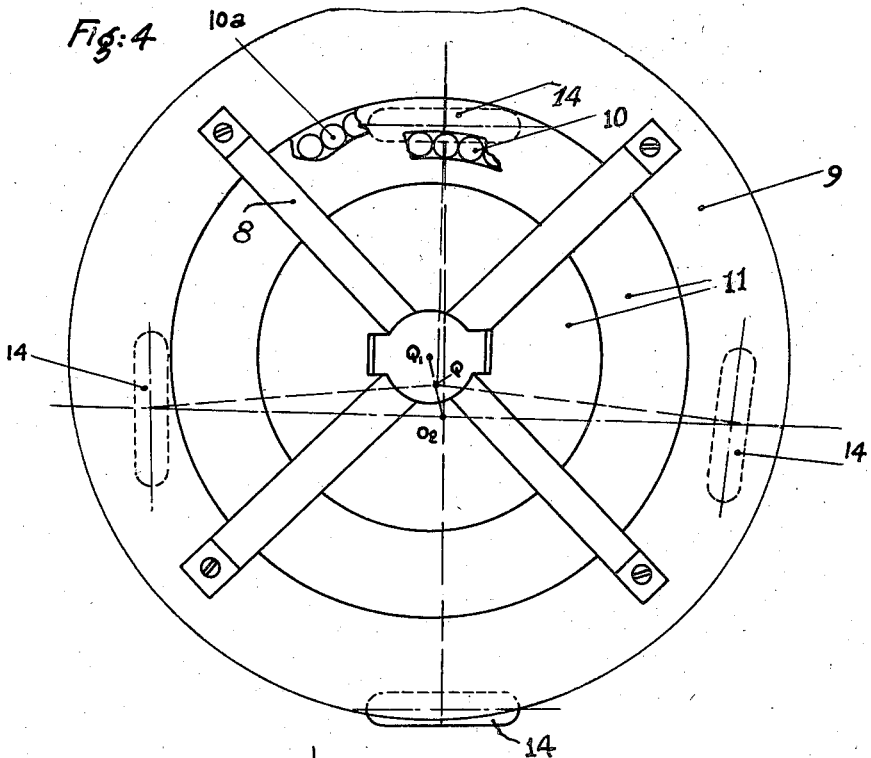
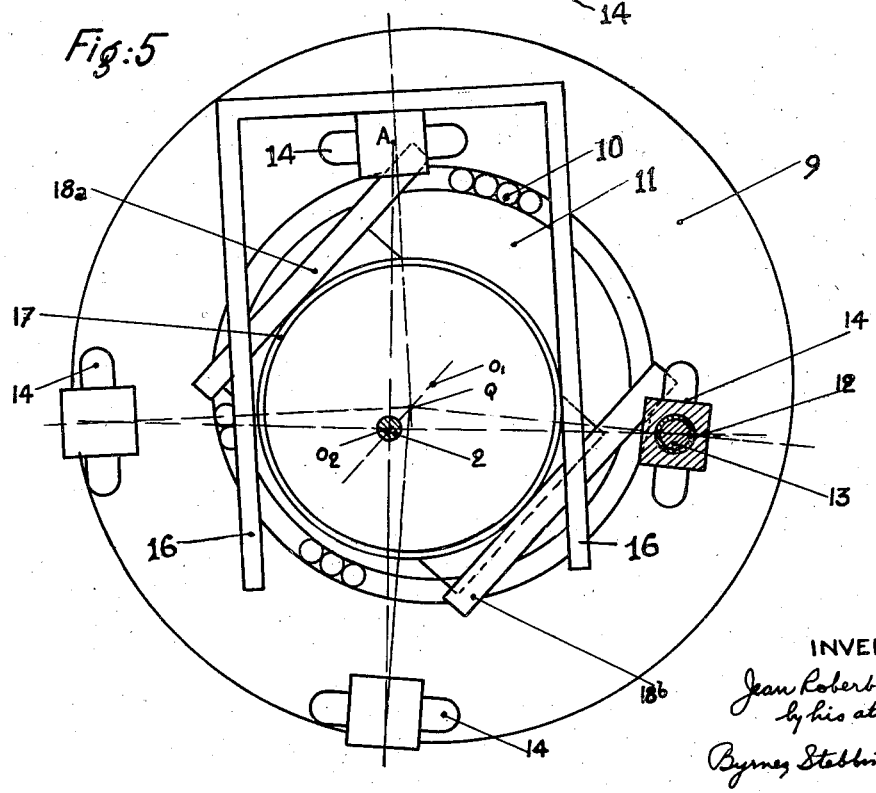

Oct. 22, 1935.  J. R. RAMIN  2,018,533
CONTINUOUSLY VARIABLE CHANGE SPEED GEAR
Filed Nov. 30, 1934  4 Sheets-Sheet 4
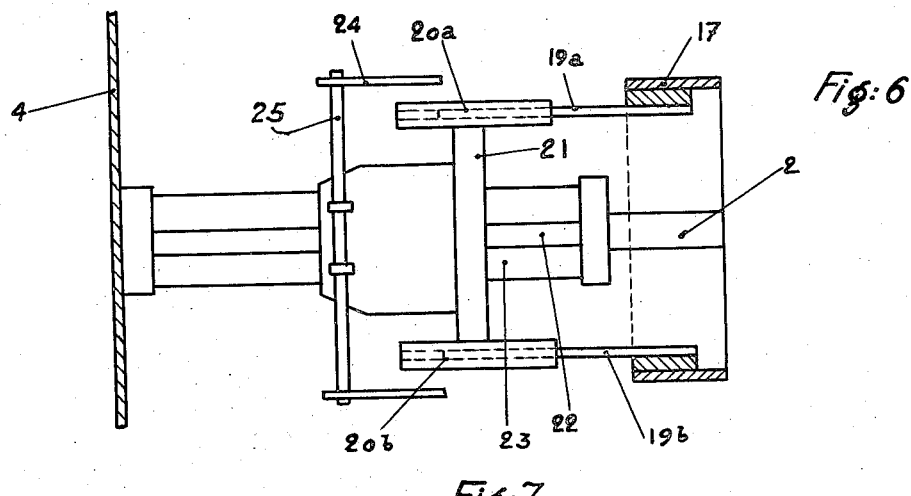
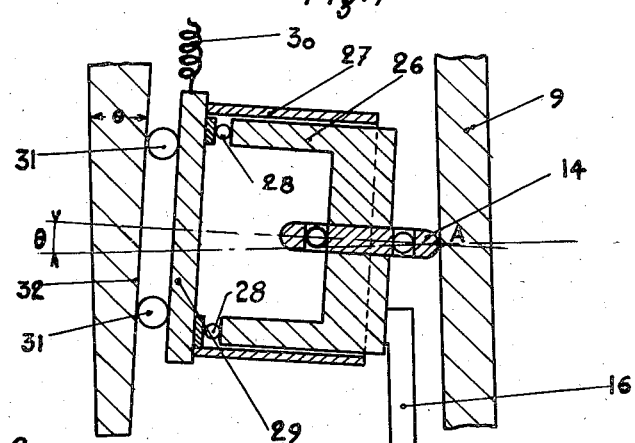
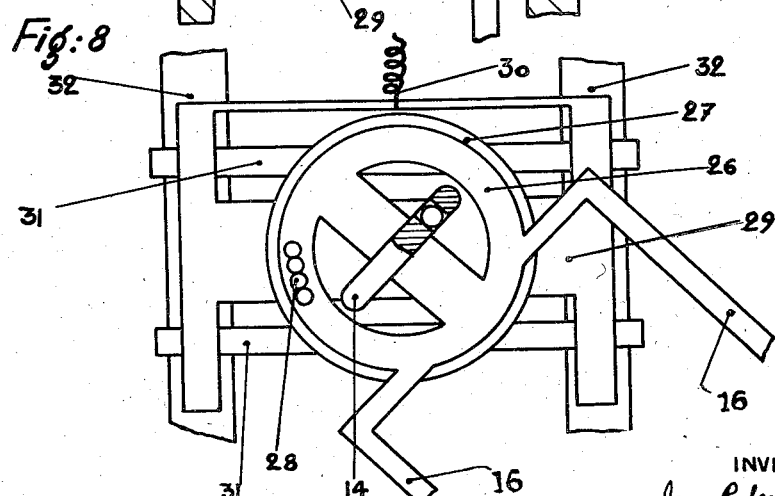
INVENTOR
Jean Robert Ramin
by his atty's
Byrnes, Stebbins & Blenko

Patented Oct. 22, 1935

2,018,533

UNITED STATES PATENT OFFICE 2,018,533

CONTINUOUSLY VARIABLE CHANGE SPEED GEAR

Jean Robert Ramin, Paris, France

Application November 30, 1934, Serial No. 755,320
In France December 14, 1933

7 Claims. (Cl. 74—69)

The object of the present invention is a change speed gear in which the simple movement of a control lever will give continuous variation of the speed ratio of the primary to the secondary shaft between limiting values which may even be greater than 1 (speed step-up) and less than 0 (reverse drive).

The invention consists essentially in the application to such a change speed gear of the principle which has been discovered that if a circle is rotating about its center (primary movement) and has at the same time a movement of rotation about a point away from its center (secondary movement), the ratio between the angular velocities of these two movements is uniquely determined at every instant by the direction of the resultant movement of the said circle at any fixed point taken in its plane. It can be proved in fact that this ratio is equal to the ratio which the length of the straight line joining the two centers of rotation bears to the intercept on the same straight line between the center of the circle and the perpendicular erected at the said fixed point to the resultant direction of movement of the circle at that point. The velocity ratio of the primary and secondary movements thus remains constant for any particular direction of this resultant movement, so that to make this ratio variable in any desired manner it will be sufficient to modify the said direction in a suitable way, say by altering the position of the point at which the perpendicular just referred to intersects the straight line joining the centers.

The invention may be put into practice by means of a disc connected to the primary shaft by a suitable universal joint arrangement and so mounted that it can rotate about its axis on a second disc coaxial with it and fixed excentrically on the secondary shaft. The first disc is guided in its movement by ball bearings contacting by means of their outer races with one of its faces and applied to this face by a component of force making an angle with the normal to the plane of this face less than the angle of friction of the outer race on the said face, so that this disc can only move in the direction defined by the planes of the bearings. Each of these bearings is capable of being angularly displaced about a straight line constituted by the intersection of its plane of rotation with a plane laid through its diameter and perpendicular to the face of the disc with which its outer race contacts. This angular displacement provides means for modifying the orientation of the bearings so that any desired variations of speed ratio can be obtained.

The invention will be better understood by means of the following description with reference to the accompanying drawings, which show by way of example one of the possible embodiments of the invention and a modification.

In the drawings

Figures 1 and 2 are diagrams intended to explain the principle of the invention, Figure 3 is an axial vertical section through a change speed gear in accordance with the invention.

Figures 4 and 5 are transverse sections of the same taken on the lines IV—IV and V—V of Figure 3 respectively and viewed in opposite directions as shown by the arrows, Figure 6 is a partial horizontal section on the line VI—VI of Figure 3, Figures 7 and 8 are a sectional elevation and end elevation respectively of a modified mounting of the bearings for guiding the disc.

Referring to Figure 1, let a circle O rotate in its own plane about its center $O_1$ at an angular velocity $\Omega_1$ (primary), while the center $O_1$ itself rotates about a point $O_2$ at an angular velocity $\Omega_2$ (secondary, so that $$\frac{\Omega_2}{\Omega_1} = K,$$

where $K$ has a constant value.

Let A be a fixed point in the plane of the circle O. The constant length $O_2 O_1$ will be called $r$ and the variable length $O_1 A$ will be called $\rho$.

When the circle O has rotated about $O_1$ through an infinitesimal angle $\omega_1$, the straight line $O_2 O_1$ will then have turned through an angle $\omega_2$ about $O_2$, and the point of the circle O which was originally located at A will have moved to C, the straight line AC being the resultant of the two displacements $AF = \omega_2 r$ and $FC = \omega_1 \rho$.

Conversely, if the surface of the circle O is moving at the point A in a direction AC, the ratio $K$ between the primary and secondary angular velocities can be obtained from this direction. It is easy to show that this direction AC is perpendicular to the straight line joining the point A to a point Q situated on the straight line $O_2 O_1$ such that $$\frac{QO_1}{O_2 O_1} = K.$$

In fact, if the straight line AD is drawn perpendicular to $AO_2$ at A, the straight line BF parallel to AD through F and the straight line CE perpendicular to BF from C, and if the values of the angles are written $$CFE = \alpha, CAD = \beta \text{ and } AFB = \gamma$$

one may write $$\tan \beta = \frac{DC}{AD};$$

$$DC = EC - ED = \omega_1 \rho \sin \alpha - \omega_2 r \sin \gamma;$$

and $$AD = FE + BF = \omega_1 \rho \cos \alpha + \omega_2 r \cos \gamma;$$

whence $$\tan \beta = \frac{\omega_1 \rho \sin \alpha - \omega_2 r \sin \gamma}{\omega_1 \rho \cos \alpha + \omega_2 r \cos \gamma};$$

By dividing the numerator and denominator of the fraction on the right hand side of this equation by $\omega_1$ there is obtained:

$$\tan \beta = \frac{\rho \sin \alpha - Kr \sin \gamma}{\rho \cos \alpha + Kr \cos \gamma}.$$

Now the angles $O_2AO_1$ and $AO_2O_1$ are equal by construction to the angles CFE and AFB respectively, that is to $\alpha$ and $\gamma$. If as shown in Figure 2, straight lines $O_1M$ and $QP$ are drawn perpendicular to $AO_2$ from $O_1$ and $Q$ and a straight line $QN$ perpendicular to $O_1M$ from $Q$, it is possible to replace the elements on the right hand side of the above equation by their equivalents in Figure 2 and to write:

$$\tan \beta = \frac{MO_1 - NO_1}{AM + NQ} = \frac{PQ}{AP} = \tan QAP.$$

Consequently the angle $QAP = \beta =$ the angle CAD, and, since AD is perpendicular to AP by construction, AQ must also be perpendicular to AC.

The position of the point Q on the line $O_2O_1$ obtained by erecting AQ perpendicular to AC at A accordingly determines the ratio of angular velocities $$\frac{\Omega_2}{\Omega_1},$$

and thus to obtain a variation of this ratio it is only necessary to make a corresponding variation of the position of the point Q along this line.

The arrangement shown in the figures from 3 onwards represents a practical application of the principles just expounded to the construction of a continuously variable speed gear mounted between a primary and a secondary shaft mounted in line.

In Figure 3, 1 is the primary shaft and 2 the secondary shaft journaled respectively in two parallel end plates 3 and 4 integral with a fixed structure 5. The common axis of rotation of the two shafts corresponds to the point $O_2$ of Figure 1. The primary shaft 1 communicates its movement by means of two universal joints 6, 7 and a cross-shaped member 8 to an annular disc 9 corresponding to the circle O of Figure 1. The disc 9 rotates by means of ball bearings 10, 10a on a disc 11 excentrically fixed to the secondary shaft 2. The center of the disc 11 corresponds to the point $O_1$. (The universal joints 6, 7 could clearly be replaced by any equivalent connection, such as a Cardan shaft or an Oldham joint.)

On the end plate 4 are pivoted symmetrically in relation to the secondary shaft arms 12, four in number in the present example, carrying rods 13 which latter are freely rotatable about their longitudinal axes in the arms 12. Each rod 13 has on its outer end a ball bearing 14 of which the outer race contacts with the disc 9. The plane of rotation of each of these bearings is slightly oblique to the disc 9, and springs 15 attached to the structure 5 act on the arms 12 so as to tend to bring them back to a position perpendicular to the disc 9. The length of the arms 12 and the rods 13 is so calculated that the angle $\theta$ between the plane of each bearing and the perpendicular is less than the angle of friction of the metal of the outer ball race on the metal of the disc 9. Under these conditions the disc 9 which is held in its plane by the bearing 10a, would be jammed between the latter and the bearing 14 if it were to move away from the center of the system; it can therefore only move in the direction defined by the planes of the bearings and their points of contact with the disc can be considered severally equivalent to the point A of Figure 1.

The direction so defined and corresponding to AC of Figure 1 is here determined by means of pairs of guides 16, each pair being integral with one of the rods 13 and perpendicular to the line of intersection of the plane of the corresponding bearing 14 with the plane of the disc 9. These guides 16 embrace a movable cylinder 17, the axis of which is in the plane passing through the axes $O_1$ and $O_2$ and corresponds to the point Q of Figure 1. The cylinder 17 is held against the excentric disc 11 by slide rails 18a, 18b parallel to the plane passing through the two axes $O_1$ and $O_2$, and it can slide along these rails to correspond with the displacement of the point Q along the straight line $O_2 O_1$. When the point Q coincides with $O_2$ in Figure 1 the speed ratio between the primary and secondary movements is equal to 1. It will be seen that in this case the whole system in the construction described rotates about the axis $O_2$, giving the equivalent of a direct drive. When Q coincides with $O_1$ the ratio K is equal to $O_1$ and the disc 9 rotates about the disc 11 without producing any driving effect on the secondary shaft. When Q is between $O_2$ and $O_1$ the speed ratio is less than unity, that is, the arrangement is a step-down speed gear. This ratio becomes greater than unity when Q is outside $O_2$ $O_1$ and beyond $O_2$ and then the speed is stepped up. If on the other hand the point Q is beyond $O_1$ then the ratio is negative, which means that the secondary shaft is driven in the opposite direction to the rotation of the primary shaft.

The movements of the cylinder 17 can be controlled by two oblique rods 19a, 19b fixed upon it, and movable in slides 20a, 20b fast with the outer race of a ball bearing 21. The inner race of this bearing is movable longitudinally along a groove 22 on a fixed sleeve 23 surrounding the secondary shaft 2. A lever 24 in the form of a fork pivoted on the structure 5 and connected by a pin 25 to the inner race of the bearing 21 provides means for moving the latter along the sleeve 23, so that by means of the slides 20a, 20b the desired alterations in position of the cylinder 17 may be achieved.

To overcome the difficulties which might ensue from eventual wear of the inner ends of the rods 13 carrying the bearings 14 and from the friction of these rods in the arms 12, the bearings may be mounted in the manner shown in Figures 7 and 8. In this modification each bearing 14 is carried by a cylinder 26 which can rotate in a cup 27 and bears by means of a ball thrust washer 28 on a member 29 integral with the cup 27 upon which a spring 30 pivoted to the fixed structure 5 acts. The member 29 is movable in the tension direction of the spring 30 by means of rollers 31 on an inclined plane 32 making with the plane of the disc 9 an angle $\theta$ which will comply with the conditions regarding friction indicated above. The guides 16 by which the orientation of the plane of the bearing 14 is varied are then fixed to the cylinder 26.

What I claim is:

1. A continuously variable change speed gear comprising in combination with a primary shaft and a secondary shaft substantially in line, a disc excentric in relation to the common axis of the said two shafts, coupling means between the disc and the primary shaft to drive the disc about its own axis, coupling means between the disc and the secondary shaft arranged to guide the disc in a movement of circular translation about the common axis and to rotate the secondary shaft at the same angular velocity, and means for modifying the direction of the resultant movement of the disc at some fixed point in its plane so as to produce corresponding variations in the angular speed ratio between the primary and secondary shafts.

2. A continuously variable change speed gear comprising in combination with a primary shaft and a secondary shaft substantially in line, a disc excentric in relation to the common axis of the said two shafts, a universal joint arrangement between the disc and the primary shaft to drive the disc about its own axis, a plate fast with the secondary shaft, means for coupling the disc and plate together so that the disc will follow the rotation of the plate but can rotate on its own axis independently of the plate, and means for modifying the direction of the resultant movement of the disc at some fixed point in its plane so as to produce corresponding variations in the angular speed ratio between the primary and secondary shafts.

3. A continuously variable change speed gear comprising in combination with a primary shaft and a secondary shaft substantially in line, a disc excentric in relation to the common axis of the said two shafts, coupling means between the disc and the primary shaft to drive the disc about its own axis, coupling means between the disc and the secondary shaft arranged to guide the disc in a movement of circular translation about the common axis and to rotate the secondary shaft at the same angular velocity, ball bearings having their outer races in contact with a face of the disc and with their planes of rotation at an angle to the normal less than the angle of friction between the outer race and the disc face, means for urging the ball bearings against the disc and means for angularly displacing the ball bearings about straight lines each constituted by the intersection of the plane of rotation of the ball bearing with a plane laid through its diameter and perpendicular to the face of the disc so as to produce variations of the resultant direction of movement of the disc corresponding to the desired variations in the angular speed ratio between the primary and secondary shafts.

4. A continuously variable change speed gear comprising in combination with a primary shaft and a secondary shaft substantially in line, a disc excentric in relation to the common axis of the said two shafts, coupling means between the disc and the primary shaft to drive the disc about its own axis, coupling means between the disc and the secondary shaft arranged to guide the disc in a movement of circular translation about the common axis and to rotate the secondary shaft at the same angular velocity, ball bearings having their outer races in contact with a face of the disc with their planes of rotation at an angle to the normal less than the angle of friction between the outer race and the disc face, a fixed structure, supports pivoted to the fixed structure and carrying ball bearings, springs acting on the supports to keep the ball bearings pressed against the disc, and means for angularly displacing the ball bearings about straight lines each constituted by the intersection of the plane of rotation of the ball bearing with a plane laid through its diameter and perpendicular to the face of the disc so as to produce variations of the resultant direction of movement of the disc corresponding to the desired variations in the angular speed ratio between the primary and secondary shafts.

5. A continuously variable change speed gear comprising a combination with a primary shaft and a secondary shaft substantially in line, a disc excentric in relation to the common axis of the said two shafts, coupling means between the disc and the primary shaft to drive the disc about its own axis, coupling means between the disc and the secondary shaft arranged to guide the disc in a movement of circular translation about the common axis and to rotate the secondary shaft at the same angular velocity, ball bearings having their outer races in contact with a face of the disc and with their planes of rotation at an angle to the normal less than the angle of friction between the outer race and the disc face, a fixed structure, supports pivoted to the fixed structure and carrying ball bearings, springs acting on the supports to keep the ball bearings pressed against the disc, means by which the bearings can rotate in relation to their respective supports about straight lines each constituted by the intersection of the plane of the ball bearing with a plane laid through its diameter and perpendicular to the face of the disc, a pair of parallel arms connected to each of the ball bearings and directed perpendicularly to the intersection of the plane of rotation of the ball bearing with the plane of the disc, a movable cylinder embraced by the arms and means for moving the cylinder in the plane containing the common axis of the two shafts and the axis of the disc to effect changes of orientation of the ball bearings corresponding to the desired variations in the angular speed ratio between the primary and secondary shafts.

6. A continuously variable speed gear as claimed in claim 5 comprising also a fixed sleeve surrounding the secondary shaft, a ball bearing mounted on the sleeve, means for allowing the inner race of the said ball bearing to slide along the sleeve without rotating, oblique guides fixed to the outer race of the ball bearing and arranged parallel to the plane passing through the common axis of the two shafts and the axis of the disc, rods fast with the movable cylinder and engaging the oblique guides, and means for moving the ball bearing along the fixed sleeve to effect displacements of the movable cylinder corresponding to the desired variations in the angular speed ratio between the primary and secondary shafts.

7. A continuously variable change speed gear comprising in combination a secondary shaft, a member excentrically fixed thereto, a disc rotatable on the excentrically mounted member about the center of the said member, a primary shaft, flexible coupling means between the primary shaft and the disc, directional guiding means in contact with a face of the disc and means for varying the direction of said guiding means.

JEAN ROBERT RAMIN.